US012561047B1

(12) United States Patent
Brannam et al.

(10) Patent No.: US 12,561,047 B1
(45) Date of Patent: *Feb. 24, 2026

(54) NATIVE APPLICATION DEVELOPMENT TECHNIQUES

(71) Applicant: Perfect Sense, Inc., Reston, VA (US)

(72) Inventors: Todd Christopher Brannam, Burke, VA (US); Robert Douglas Ward, Bristow, VA (US); David Gang, Oakton, VA (US); Hyoo Lim, Herndon, VA (US); Jeremy Collins, Leesburg, VA (US)

(73) Assignee: Perfect Sense, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,134

(22) Filed: Jul. 1, 2022

Related U.S. Application Data

(63) Continuation of application No. 15/332,206, filed on Oct. 24, 2016, now Pat. No. 11,379,102.

(Continued)

(51) Int. Cl.
*G06F 3/04842* (2022.01)
*G06F 3/0481* (2022.01)
(Continued)

(52) U.S. Cl.
CPC ........ *G06F 3/04842* (2013.01); *G06F 3/0481* (2013.01); *G06F 8/656* (2018.02); *G06F 8/658* (2018.02); *H04L 67/01* (2022.05)

(58) Field of Classification Search
CPC .... G06F 3/0481; G06F 3/04842; G06F 9/451;

G06F 8/38; G06F 16/9535; G06F 16/957; G06F 16/9577; G06F 8/60–66; H04M 1/72563–72577; H04M 1/72448–72463; H04L 67/01; H04L 67/025; H04L 9/40
See application file for complete search history.

(56) References Cited

U.S. PATENT DOCUMENTS 7,124,373 B1 * 10/2006 Patil ...................... G06F 3/0486
715/767
8,065,628 B2 * 11/2011 Oshiro .................. G06F 3/0481
715/810

(Continued)

OTHER PUBLICATIONS

"React Native: A framework for building native apps using React," Facebook Inc., Mar. 2015, retrieved from the Internet: URL <https://facebook.github.io/react-native/>, 3 pages.

*Primary Examiner* — Benjamin Smith
(74) *Attorney, Agent, or Firm* — Fish & Richardson P.C.

(57) ABSTRACT

In some implementations, a system is capable of dynamically adjusting the configuration of an application without requiring an entire application-wide update. For instance, the system can perform a dynamic application to vary the content provided for output on the application, the arrangement of content within a user interface of the application, techniques by which a user interacts with or accesses the content on the user interface, among others. In some instances, the system can process the dynamic updates while the application is running as an active process on a client device, or while the user is presently using the application. In addition, the system can execute the dynamic updates in manner to minimally disrupt user experiences associated with the application.

20 Claims, 6 Drawing Sheets

Related U.S. Application Data

(60) Provisional application No. 62/245,967, filed on Oct. 23, 2015.

(51) Int. Cl.

| | | |
|---|---|---|
| *G06F 8/656* | (2018.01) | |
| *G06F 8/658* | (2018.01) | |
| *H04L 67/01* | (2022.01) | |

(56) References Cited

U.S. PATENT DOCUMENTS

| | | | | |
|---|---|---|---|---|
| 8,731,610 | B2 * | 5/2014 | Appaji | H04W 8/183 |
| | | | | 455/556.1 |
| 8,751,925 | B1 * | 6/2014 | Zhang | G06F 16/9577 |
| | | | | 715/240 |
| 8,972,969 | B2 * | 3/2015 | Gaither | G06F 8/656 |
| | | | | 717/170 |
| 9,201,645 | B2 * | 12/2015 | Doi | H04L 67/10 |
| 9,361,281 | B2 * | 6/2016 | Zhang | G06F 16/9577 |
| 9,626,343 | B2 * | 4/2017 | Zhang | G06F 16/9574 |
| 9,652,220 | B2 * | 5/2017 | Tammam | G06F 8/65 |
| 9,679,404 | B2 * | 6/2017 | Douglas | G06F 3/0481 |
| 9,779,124 | B2 * | 10/2017 | Seo | G06F 16/178 |
| 9,823,917 | B2 * | 11/2017 | Reiss | G06F 8/656 |
| 9,917,879 | B2 * | 3/2018 | Haykal | G06F 9/451 |
| 9,952,848 | B2 * | 4/2018 | Mark | G06F 8/61 |
| 10,353,993 | B2 * | 7/2019 | Zhang | G06F 40/143 |
| 10,528,892 | B2 * | 1/2020 | Xuan | G06Q 10/00 |
| 11,334,642 | B2 * | 5/2022 | Weng | G06F 16/958 |
| 11,379,102 | B1 | 7/2022 | Brannam et al. | |
| 2003/0177485 | A1 | 9/2003 | Waldin et al. | |
| 2004/0216054 | A1 | 10/2004 | Mathews et al. | |
| 2006/0168574 | A1 | 7/2006 | Giannini et al. | |
| 2007/0186182 | A1 * | 8/2007 | Schiller | G06F 16/957 |
| | | | | 707/E17.119 |
| 2008/0005679 | A1 | 1/2008 | Rimas-Ribikauskas et al. | |
| 2008/0134045 | A1 * | 6/2008 | Fridman | G06F 9/44505 |
| | | | | 715/735 |
| 2008/0146245 | A1 * | 6/2008 | Appaji | H04W 4/029 |
| | | | | 455/456.1 |
| 2008/0320413 | A1 | 12/2008 | Oshiro et al. | |
| 2009/0163182 | A1 | 6/2009 | Gatti et al. | |
| 2009/0222806 | A1 | 9/2009 | Faus et al. | |
| 2009/0249321 | A1 | 10/2009 | Mandyam et al. | |
| 2010/0153866 | A1 * | 6/2010 | Sharoni | G06F 9/452 |
| | | | | 715/762 |
| 2011/0029899 | A1 * | 2/2011 | Fainberg | G06F 12/0862 |
| | | | | 715/806 |
| 2011/0055683 | A1 * | 3/2011 | Jiang | G06F 16/957 |
| | | | | 709/219 |
| 2011/0191407 | A1 * | 8/2011 | Fu | G06F 8/38 |
| | | | | 709/203 |
| 2012/0117497 | A1 | 5/2012 | Uola et al. | |
| 2012/0117499 | A1 | 5/2012 | Mori et al. | |
| 2012/0162266 | A1 * | 6/2012 | Douglas | G06T 11/60 |
| | | | | 345/677 |
| 2013/0080972 | A1 | 3/2013 | Moshrefi et al. | |
| 2013/0104114 | A1 * | 4/2013 | Reiss | G06F 8/65 |
| | | | | 717/170 |
| 2013/0212487 | A1 * | 8/2013 | Cote | G06F 9/451 |
| | | | | 715/745 |
| 2013/0227539 | A1 * | 8/2013 | D'Aurelio | H04L 67/01 |
| | | | | 717/169 |
| 2013/0332917 | A1 * | 12/2013 | Gaither | G06F 8/656 |
| | | | | 717/170 |
| 2014/0033019 | A1 * | 1/2014 | Zhang | G06F 16/986 |
| | | | | 715/234 |
| 2014/0058999 | A1 * | 2/2014 | Seo | G06F 16/178 |
| | | | | 707/609 |
| 2014/0108503 | A1 * | 4/2014 | Haykal | G06F 9/451 |
| | | | | 709/203 |
| 2014/0282477 | A1 * | 9/2014 | Modarresi | G06F 16/958 |
| | | | | 717/171 |
| 2014/0304590 | A1 * | 10/2014 | Zhang | G06F 40/154 |
| | | | | 715/234 |
| 2015/0026566 | A1 * | 1/2015 | Hui | G06F 16/957 |
| | | | | 715/240 |
| 2015/0178070 | A1 * | 6/2015 | Doi | G06F 8/65 |
| | | | | 717/172 |
| 2015/0379160 | A1 * | 12/2015 | Avraham | G06F 3/0484 |
| | | | | 715/767 |
| 2016/0132324 | A1 | 5/2016 | Elder et al. | |
| 2016/0314101 | A1 * | 10/2016 | Zhang | G06F 16/9577 |
| 2016/0335079 | A1 * | 11/2016 | Tammam | G06F 8/656 |
| 2016/0357357 | A1 * | 12/2016 | Lemay | G06F 3/0482 |
| 2017/0177318 | A1 * | 6/2017 | Mark | G06F 16/9535 |
| 2017/0177736 | A1 * | 6/2017 | Zhang | G06F 16/986 |
| 2018/0046929 | A1 * | 2/2018 | Xuan | G06Q 10/00 |

\* cited by examiner

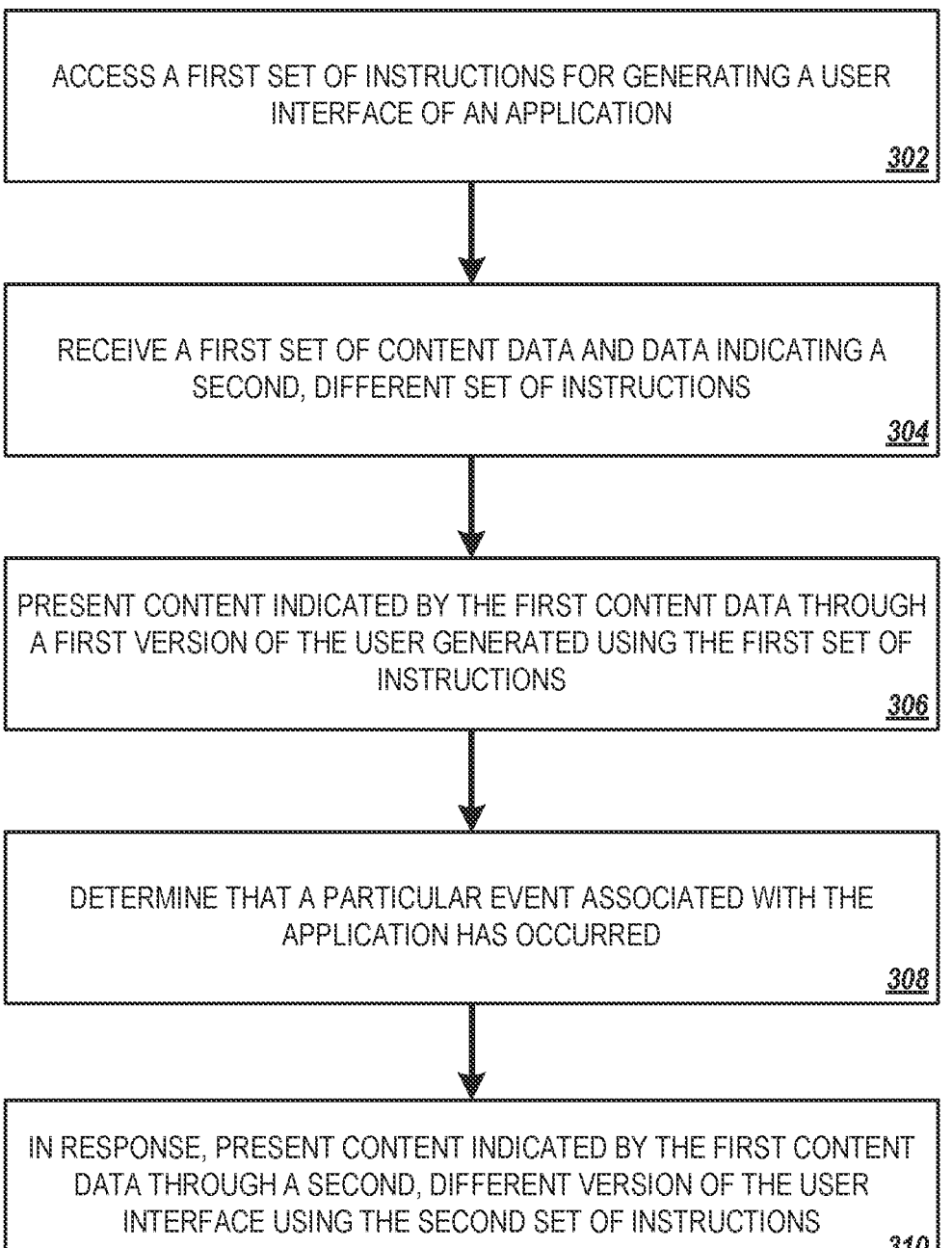

300

ACCESS A FIRST SET OF INSTRUCTIONS FOR GENERATING A USER INTERFACE OF AN APPLICATION
302

RECEIVE A FIRST SET OF CONTENT DATA AND DATA INDICATING A SECOND, DIFFERENT SET OF INSTRUCTIONS
304

PRESENT CONTENT INDICATED BY THE FIRST CONTENT DATA THROUGH A FIRST VERSION OF THE USER GENERATED USING THE FIRST SET OF INSTRUCTIONS
306

DETERMINE THAT A PARTICULAR EVENT ASSOCIATED WITH THE APPLICATION HAS OCCURRED
308

IN RESPONSE, PRESENT CONTENT INDICATED BY THE FIRST CONTENT DATA THROUGH A SECOND, DIFFERENT VERSION OF THE USER INTERFACE USING THE SECOND SET OF INSTRUCTIONS
310

FIG. 3

NATIVE APPLICATION DEVELOPMENT TECHNIQUES

CROSS-REFERENCE TO RELATED APPLICATIONS

This application is a continuation of U.S. application Ser. No. 15/332,206, filed Oct. 24, 2016, which claims priority to U.S. Application Ser. No. 62/245,967, filed on Oct. 23, 2015, both of which is incorporated by reference in its entirety.

BACKGROUND

Advances in mobile device and communications technologies have increased the number of avenues of user Internet access and media consumption. Users now interact with web content using applications running on a variety of different communication devices (e.g., smart phones, personal computers, personal digital assistants (PDAs), etc.), and are doing so with increasing regularity.

SUMMARY

Applications are often statically updated by manually processing application updates through an electronic content store. For instance, an application can be updated by downloading a software update from a content store that adjusts the configuration of the application. Static updates to the application can be used to provide additional or enhanced functionalities, adjust user interface configuration, or adjust the processing of user input data. However, static application updates are often cumbersome to process for application developers, and often require manual input from users to initiate the application process. In addition, because many application updates are performed on an ad-hoc basis, the execution of such application updates can often be disruptive to user experience.

In some implementations, a system is capable of dynamically adjusting the configuration of an application without requiring an entire application-wide update. For instance, the system can perform a dynamic application to vary the content provided for output on the application, the arrangement of content within a user interface of the application, techniques by which a user interacts with or accesses the content on the user interface, among others. In some instances, the system can process the dynamic updates while the application is running as an active process on a client device, or while the user is presently using the application. In addition, the system can execute the dynamic updates in manner to minimally disrupt user experiences associated with the application.

The architecture of the system generally includes one or more client devices, an associated server, and an administrator device. The one or more client devices can be used to provide an application for output. The associated computing system can store content data and user interface data used to carry out a dynamic application update on the one or more client devices. The administrator device provides a configuration interface where an administrator (e.g., an application designer or an application developer) can specify and customize instructions for executing the application. For example, user input by the administrator on the configuration interface can be used to generate customized application objects that include content data and user interface data. The application objects are then transmitted to the client device to dynamically update the application.

The architecture of the system provides various improvements in dynamically configuring an application to provide customized interfaces that can be automatically adjusted without requiring manual application updates from a content store. For example, in conventional application development systems, in order to generate a new user interface to be displayed on an application, a software update for the entire application may be necessary because user interface configuration is often pre-configured within application code. The architecture of the present system, however, utilizes the transmission of application objects including UI data and content data that are distinct and separate from one another such that variations of different user interface configurations can be constructed for the same collection of content. For instance, using a single transmission of a data package from an associated server, the client device may process different UI configurations in order to generate multiple user interfaces for representing the same content without requiring an application-wide update from the server. As described below, this enables the application to utilize less storage space on the client device and less network bandwidth since the entire application does not require an update each time a new version of a user interface is to be generated.

In addition, the architecture of the system enables the system to address various problems that arise in the network environment of client-based applications. As an example, application configurations provided by servers are often static for significant periods of time and may require major updates to application code. This can be time consuming for application developers and users since it requires periodic manual reconfiguration of applications, and periodic delivery of the reconfiguration of applications, and periodic delivery of the reconfigured applications. As described in more detail below, the architecture of the system addresses this problem by, among other techniques, employing the use of application objects that include separate UI data and content data to automatically adjust applications to be displayed without requiring changes to the entire application configuration. This enables an administrator or a developer to adjust specific aspects of the application without necessarily having to reconfigure the entire application structure to provide enhanced functional capabilities. Moreover, processing of the UI data and the content data can automatically and dynamically alter the way in which a user interacts with content provided for output on the application without requiring users to manually download application updates.

Another problem that often arises in networked environments is that applications are often unable to provide effective real-time adjusts that are appropriate for a user's particular circumstances. For example, while some applications can be statically reconfigured based on a set of user-specified preferences (e.g., applying a specific theme, adjusting font size and color), such applications are often unable to dynamically adjust (1) the content that is provided for display on the application, and (2) the arrangement of a collection of content provided on the application (e.g., specifying the use of user interface elements for particular types of content, varying the placement of content on the user interface based on the type of content to be displayed) without requiring a manual update.

Yet another problem that often arises in networked environments is that administrators that create and develop applications that are published on an electronic content store often face a cumbersome process to obtain approvals to publish updates to the application through the electronic content store. For example, application developers often have to satisfy application requirements set forth by a third-party organization that manages the electronic content store. As described in more detail below, the architecture of the system can address this problem by providing a configuration interface that provides an administrator with a large degree of control in configuring dynamic updates to an application without having to submit configured updates for approval by the third-party organization that manages the electronic content store. The configuration interface enables the administrator to make adjustments using a user-friendly interface (e.g., adding or removing pieces of content, changing the structure of a user interface) rather than having to adjust the application code directly.

In one general aspect, a computer-implemented method may include the operations of: accessing, by a client device, a first set of instructions for generating a first version of a user interface of an application that is running on the client device; while or after accessing the first set of instructions, receiving, by the client device in a transmission over a network from a computing device, (i) a first set of content data indicating content that is to be presented through the user interface of the application, and (ii) data indicating a second set of instructions for generating a second version of the user interface of the application that is different from the first version of the user interface of the application; after receiving the first set of content data and data indicating the second set of instructions, using the first set of content data and the first set of instructions to present, as output of the client device, content through the first version of the user interface of the application; while or after using the first set of content data and the first set of instructions to present content through the first version of the user interface of the application, determining, by the client device, that a particular event associated with the application has occurred; and in response to determining that the particular event associated with the application has occurred, using the first set of content data and the second set of instructions to present, as output of the client device, content through the second version of the user interface of the application.

One or more implementations can include the following optional features. In some implementations, receiving, by the client device, (i) the first set of content data indicating content that is to be presented through the user interface of the application, and (ii) data indicating the second set of instructions for generating the second version of the user interface of the application that is different from the first version of the user interface of the application includes: receiving, by the client device, a data structure associated with the application that is running on the client device, the data structure including (i) a first set of content data indicating content that is to be presented through the user interface of the application, and (ii) data indicating a second set of instructions for generating a second version of the user interface of the application that is different from the first version of the user interface of the application.

In some implementations, using the first set of content data and the first set of instructions to present content through the first version of the user interface of the application includes: determining that the first set of instructions specify that the first version of the user interface is to include a first arrangement of user interface elements; based on determining that the first set of instructions specify that the first set of user interface elements are to be included in the first version of the user interface, generating, by the client device, the first version of the user interface including the first arrangement of user interface elements. Using the first set of content data and the second set of instructions to present content through the second version of the user interface of the application includes: determining that the second set of instructions specify that the second version of the user interface is to include a second arrangement of user interface elements that is different from the first arrangement of user interface elements; and based on determining that the second set of instructions specify that the second set of user interface elements are to be included in the second version of the user interface, generating, by the client device, the second version of the user interface including the second arrangement of user interface elements.

In some implementations, determining that the first set of instructions specify that the first version of the user interface is to include the first arrangement of user interface elements includes the operations of: determining that the first set of instructions specify that the first version of the user interface is to include a first set of one or more user interface elements; and where determining that the second set of instructions specify that the second version of the user interface is to include the second arrangement of user interface elements includes the operations of: determining that the second set of instructions specify that the second version of the user interface is to include a second set of one or more user interface elements that are different from the first set of one or more user interface elements.

In some implementations, determining that the first set of instructions specify that the first version of the user interface is to include the first arrangement of user interface elements includes the operations of: determining that the first set of instructions specify that the first version of the user interface is to include one or more user interface elements at each location in a first set of one or more locations on the user interface; and determining that the second set of instructions specify that the second version of the user interface is to include the second arrangement of user interface elements includes the operations of: determining that the second set of instructions specify that the second version of the user interface is to include one or more user interface elements at each location in a second set of one or more locations on the user interface that are different from the first set of one or more locations on the user interface.

In some implementations, using the first set of content data and the first set of instructions to present content through the first version of the user interface of the application includes the operations of: presenting, as output of the client device, (i) the first version of the user interface including the first arrangement of user interface elements, and (ii) content indicated by the first set of content data through one or more user interface elements in the first arrangement of user interface elements; and where using the first set of content data and the second set of instructions to present content through the second version of the user interface of the application includes the operations of: presenting, as output of the client device, (i) the second version of the user interface including the second arrangement of user interface elements, and (ii) content indicated by the first set of content data through one or more user interface elements in the second arrangement of user interface elements.

In some implementations, the computer-implemented method further includes the operations of: while using the first set of content data and the first set of instructions to present, as output of the client device, content through the first version of the user interface of the application, receiving, by the client device, data indicating user c received at a first user interface element in the first arrangement of user interface elements that corresponds to a first function of the application; and in response to receiving data indicating user input received at the first user interface element in the first arrangement of user interface elements, executing, by the client device, the first function of the application to which the first user interface element corresponds.

In some implementations, the computer-implemented method further includes the operations of: while using the first set of content data and the second set of instructions to present, as output of the client device, content through the second version of the user interface of the application, receiving, by the client device, data indicating user input received at a second, different user interface element in the second arrangement of user interface elements that corresponds to a second, different function of the application; and in response to receiving data indicating user input received at the second user interface element in the second arrangement of user interface elements, executing, by the client device, the second function of the application to which the second user interface element corresponds.

In some implementations, determining that the particular event associated with the application has occurred includes the operations of: determining, by the client device, that the application has been running on the client device as a background process for a particular amount of time.

In some implementations, determining that the particular event associated with the application has occurred includes determining, by the client device, that the client device has physically entered or exited a particular geographic location.

In some implementations, the computer-implemented method further includes the operations of: sending, by the client device, a request to the computing device for data indicating instructions for generating the user interface of the application and data indicating content that is to be presented through the user interface of the application; and where receiving (i) the first set of content data indicating content that is to be presented through the user interface of the application, and (ii) data indicating the second set of instructions for generating the second version of the user interface of the application that is different from the first version of the user interface of the application includes the operations of: based on sending the request to the computing device, receiving, by the client device, data from the computing device including (i) the first set of content data indicating content that is to be presented through the user interface of the application, and (ii) data indicating the second set of instructions for generating the second version of the user interface of the application that is different from the first version of the user interface of the application.

In some implementations, the application that is running on the client device is that which was downloaded to the client device from a particular digital distribution platform, and wherein the computing device is not part of the particular digital distribution platform.

In some implementations, the computer-implemented method further includes the operations of: receiving, by the client device, data indicating the first set of instructions for generating the first version of the user interface of the application; in response to receiving the data indicating the first set of instructions for generating the first version of the user interface of the application, storing, by the client device, the first set of instructions for generating the first version of the user interface of the application; and where accessing, by the client device, the first set of instructions for generating the first version of the user interface of the application that is running on the client device further includes the operations of: accessing, by the client device, the first set of instructions stored on the client device.

In some implementations, the computer-implemented method further includes the operations of: in response to receiving the first set of content data and the data indicating the second set of instructions, determining, by the client device, that the second set of instructions is different from the first set of instructions stored on the client device; and after using the first set of content data and the first set of instructions to present, as output of the client device and based on determining that the second set of instructions is different from the first set of instructions stored on the client device, storing, by the client device, the second set of instructions in place of the first set of instructions.

In some implementations, the method further includes the operations of: launching the application on the client device; where accessing, by the client device, the first set of instructions stored on the client device includes the operation of accessing, by the client device, the first set of instructions stored on the client device in response to launching the application on the client device.

In another general aspect, a computer-implemented method includes the operations of: receiving, by a computing device and from a client device, a message that indicates a request for data to be used by the client device in association with an application that is running on the client device; in response to receiving the message from the client device: obtaining, by the computing device, user interface data indicating instructions that are to be used by the client device to update a user interface of the application in response to detecting a particular event; obtaining, by the computing device, content data indicating instructions that are to be used by the client device to present content through the user interface of the application irrespective of an occurrence of the particular event; and providing, by the computing device, the user interface data and that content data to the client device.

In some implementations, the message that indicates the request for data to be used by the client device in association with an application that is running on the client device further comprises content data indicating content that was previously provided for output through a user interface for a prior session of the application; and where obtaining the content data indicating instructions that are to be used by the client device to present content through the user interface of the application irrespective of an occurrence of the particular event includes the operations of: determining that an age of the content that was previously provided for output through the user interface for the prior session of the application satisfies a threshold age associated with content that is determined to irrelevant; in response to determining that an age of the content that was previously provided for output through the user interface for the prior session of the application satisfies a threshold age associated with content that is determined to irrelevant, obtaining new content that is to be presented through the user interface of the application; and generating content data indicating instructions that are to be used by the client device to present the new content through the user interface of the application.

In some implementations, the message that indicates the request for data to be used by the client device in association with an application that is running on the client device further comprises user interface data indicating a first version of the user interface of the application that was previously presented as output of the client device; and obtaining the user interface data indicating instructions that are to be used by the client device to update a user interface of the application in response to detecting a particular event includes the operations of: determining that the prior version of the user interface of the application that was previously presented as output of the client device cannot be used to provide, for output to the client device, the new content that is to be presented through the user interface of the application; and in response to determining that the prior version of the user interface of the application that was previously presented as output of the client device cannot be used to provide, for output to the client device, the new content that is to be presented through the user interface of the application, generating instructions that are to be used by the client device to update the prior interface of the application in response to detecting a particular event.

In some implementations, the computer-implemented method includes the operations of: providing, by a computing device, a configuration interface for specifying (i) a user selection of content that is to be presented through a user interface of the application, and (ii) a user selection of a set of instructions that is to be used by the client device for generating an updated version of the application in response to detecting a particular event; receiving, by the computing device and through the configuration interface, (i) a particular user selection of content that is to be presented through the user interface of the application, and (ii) a particular user selection of a set of instructions that is to be used by the client device for generating an updated version of the application in response to detecting a particular event; generating instructions that are to be used by the client device to present content through the user interface of the application irrespective of an occurrence of the particular event based on particular user selection of content that is to be presented through the user interface of the application; and generating instructions that are to be used by the client device to update the user interface of the application in response to detecting the particular event based on the particular user selection of a set of instructions that is to be used by the client device for generating an updated version of the application in response to detecting a particular event.

In some implementations, providing the configuration interface includes the operation of providing a configuration interface that further specifies a user selection of one or more particular events, an occurrence of at least one of the particular events to be used by the client device to update the user interface of the application in response to detecting a particular event.

Implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Other implementations of this and other aspects include corresponding methods, apparatus, and computer programs, configured to perform the actions of the systems, encoded on computer storage devices.

The details of one or more implementations are set forth in the accompanying drawings and the description below. Other features will be apparent from the description and drawings.

BRIEF DESCRIPTION OF THE DRAWINGS

FIG. 3 illustrates an example of a process for dynamically adjusting native applications that are executed on various client devices.

DETAILED DESCRIPTION

Figure 1:
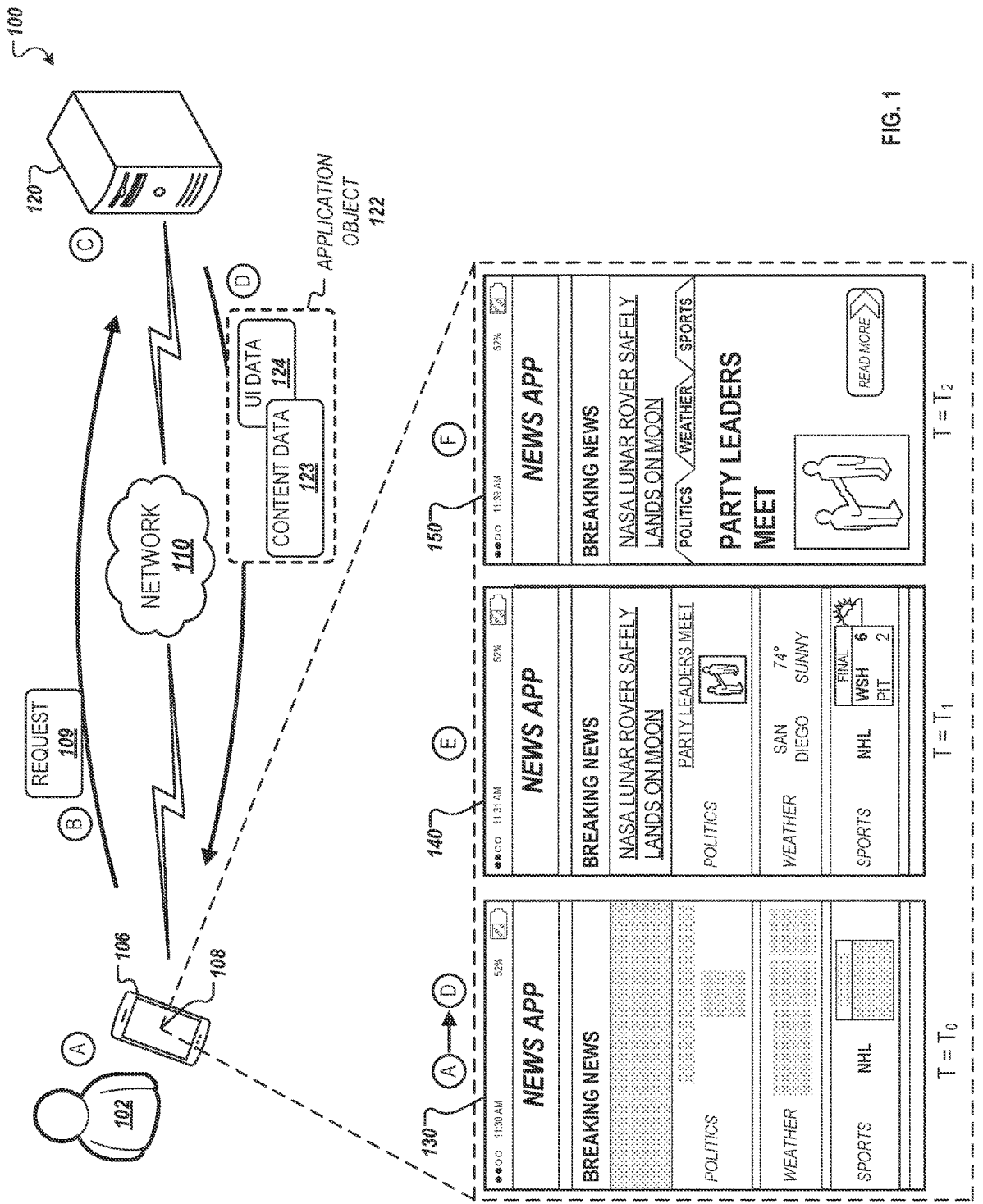
FIG. 1 illustrates an example of a system that is capable of dynamically adjusting native applications that are executed on various client devices.

In general, a system is capable of dynamically adjusting the configuration of an application without requiring an entire application-wide update. For instance, the system can perform a dynamic application to vary the content provided for output on the application, the arrangement of content within a user interface of the application, techniques by which a user interacts with or accesses the content on the user interface, among others. In some instances, the system can process the dynamic updates while the application is running as an active process on a client device, or while the user is presently using the application. In addition, the system can execute the dynamic updates in manner to minimally disrupt user experiences associated with the application.

As described throughout, an "application object" refers to a data package that is exchanged between a client device and an associated application server in relation to performing a dynamic update to the application. The application object includes "content data," which refers to one or more pieces of electronic content that can be provided for display on a user interface of the application. For example, content data can include one or more of textual content, graphical content, audible content, among other types of digital information. The application object also includes "user interface data" (or "UI data"), which refers to instructions for arranging content to be displayed on the user interface of the application, and/or a collection of user interface elements (e.g., buttons, text fields, list forms) that can be displayed on the user interface of the application.

As described throughout, a "version" of an application refers to a specific instance of an application that is associated with a particular collection of content provided for display on the application and a particular arrangement of the content within an interface of the application. A version of the application can be updated without requiring a change to the application package interface (API) and/or other general configuration files associated with an application-wide update through a content store. For example, a version of the application be changed while the application is still being used as an active process on a client device, or even when a user is presently using the application. In addition, in some instances, multiple version updates to an application can be performed based on a single data communication between the client device and an associated application server.

As described throughout, several different types of users may be associated with the systems and techniques described throughout. For example, a "user" refers to an end-user of a client on which an application is configured and updated based on the techniques described throughout. A user can interact with the application by providing inputs a user interface provided by the application. In addition, an "administrator" refers to, for example, a content publisher or an application developer that is associated with a content management system (CMS). The administrator designs and/or configures the application that is provided for output on the client device for use the user. For example, the administrator may select content to be displayed on the application, specify changes to the content to be displayed over periods of time, or configure the arrangement of content on the application. In some instances, the administrator may be associated with a third party organization that is distinct from an organization that manages a content application store where the application is published and available for access.

The architecture of the system generally includes one or more client devices, an associated server, and an administrator device. The one or more client devices can be used to provide an application for output. The associated computing system can store application objects, including content data and user interface data, which are used to execute a dynamic application update on the one or more client devices. The administrator device provides a configuration interface where an administrator (e.g., an application designer or an application developer) can specify and customize instructions for executing the application. For example, user input by the administrator on the configuration interface can be used to generate customized application objects that include content data and user interface data. The application objects are then transmitted to the client device to dynamically update the application.

The application objects received by the mobile device can be processed and stored in a variety of configurations. In some implementations, an application of the mobile device stores the application objects upon receipt and uses the content to subsequently execute multiple application updates. In such implementations, when the administrator publishes a new dynamic update for the application, associated application objects are transmitted to the client devices and used to automatically execute changes to the application specified by the dynamic update without requiring a manual application-wide update. Updates can be executed incrementally such that a single configuration update by the administrator can be used to cause a sequence of changes to the application using the stored application objects (e.g., without communication with the additional server). Updates can also be performed at specified time points or in response to the satisfaction of specified triggers or conditions. In this regard, an application can be dynamically updated without compromising a user's present activity on the client device and/or activity on the application. For example, the application may be updated when it is determined to be running as a background process, or during a time point when user activity is minimal. In addition, reoccurring updates can be configured and/or adjusted to be performed at different frequencies.

The execution of dynamic updates can be used to generate alternative interfaces that provide the same collection of content items. For example, alternative interfaces can include alternative user interface elements for rendering the same content, alternative layouts for organize the same content groupings, or different sections for organizing the sequence of individual content items within a collection of content. The execution of dynamic updates can also be used to vary the content that is provided between different versions of the application. Content can be added or removed based on the execution of an update. In addition, a collection of content can be reorganized or re-classified based on using alternative grouping techniques.

The application can be configured to execute on the client devices in a variety of ways. In one implementation, the application is configured as a thin client application with a displayable icon to launch the application as a landing page for when the application is initially launched (e.g., with no content data or UI data). The application further includes a URL that, upon receiving a user selection on the icon to launch the application, causes the client device to display the landing page while simultaneously accessing an associated application server to obtain UI data and content data to be provide for display on the client device. The application then executes a set of instructions to construct the UI data and/or the content data to render a user interface on which the user can interface with to perceive and explore the received content.

In a second implementation, the application is configured as a shell UI application that initially provides baseline user interface with a generic structure that does not include any content. The application then exchanges communications with an associated server to obtain application objects, including content data, to populate the structure of the baseline user interface. The application can then subsequently update the structure of the baseline user interface using UI data that specifies instructions to adjust the user interface elements included in the user interface, or adjusts the existing structure of the user interface.

In a third implementation, the application is configured as a thin UI application that initially displays content that is locally stored on the client device from a prior application session. The application then exchanges communications with an associated server, as noted above, to obtain new content. The new content received from the server is then used to replace the content from the prior application session that is initially provided on the application.

FIG. 1 illustrates an example of a system 100 that is capable of dynamically adjusting native applications that are executed on various client devices. The system 100 includes a client device 106 associated with a user 102 and a computing device 120 that exchange data communications over a network 110. The client device 106 executes an application 108 that is dynamically updated based on periodic data transmissions between the client device 106 and the computing device 120 as noted in more detail below.

For context, a dynamic application update, such as the example illustrated in FIG. 1, can be characterized as a change from an initial version an application with an initial interface to an updated version of the application with an updated interface. Multiple dynamic application updates can be processed and executed sequentially such that each change in the interface represents an iteration of a dynamic update. In the example illustrated in FIG. 1, the generation of a user interface 130 and transition to the user interface 140 represents a first iteration in which the user interface 130 represents an initial interface of the application 108, and user interface 140 represents an updated interface of the application 108. In addition, the transition between interface 140 to interface 150 represents a second iteration in which the user interface 140 represents an initial interface of the application 108, and the user interface 150 represents an updated interface of the application 108. Thus, the status associated with any given interface for the application 108 (with the exception of the first configuration of the application 108 after an installation from a content store) can be reinitialized for subsequent dynamic application updates.

In general, the interaction between the client device 106 and the computing device 120 can represented as a sequence of stages, which are depicted with letters "A" to "F" in the figure. At each stage, the client device 106 provides a particular version of an application 108 that is provided for output to the user 102. As depicted, an interface 130 is initially configured during stages "A" through "D," whereas interface 140 are configured at stage "E," and interface 150 is configured at stage "F."

Referring initially to the components of the system 100, the client device 106 can be any type of personal electronic device such as a smart phone, a laptop computing device, a tablet computing device, a desktop computing device, a smart wearable device, or another other types of network-enabled computing devices. Although FIG. 1 illustrates a single client device (e.g., the client device 106) exchanging communications with the computing device 120, the architecture of the system 100 enables multiple client devices associated with different users to simultaneously or sequentially exchange communications with the computing device 120.

The computing device 120 may be one or more servers that are configured to provide dynamic updates that configure and/or adjust the application 108 that operates on the client device 106. In some implementations, the computing device 120 includes a web server, a database server, and a CMS. The components may either be separated logically (e.g., as separate modules of a single computing device), or separated physically (e.g., as separate computing devices that exchange data communications over the network 110). More particular descriptions related to the backend components of the system 100 (e.g., the computing device 120) are provided below with respect to FIGS. 4A and 4B.

Referring briefly now to the stages that are illustrated in the figure, at stage "A," the client device 106 initially generates interface 130, which includes a general arrangement for content. At stage "B," the client device 106 transmits a request 109 to update the application 108 the computing device 120 over the network 110. At stage "C," the computing device 120 identifies a dynamic update for the application 108 and associated data to provide with the update to the client device 106. At stage "D," the computing device 120 transmits an application object 122, which includes content data 123 and UI data 124, to the client device 106 over the network 110. At step "E," the client device 106 processes the application object 122 and dynamically updates the application 108 to a new version, which then generates the interface 140 for output to the user 102. At step "F," the client device 106 receives user input from the user 102, which then provides the interface 150 for output.

Referring now to the example depicted in FIG. 1, the user 102 uses the application 108 (e.g., "NEWS APPS") to view breaking news information pertaining to different topics such as politics, weather, and sports. The application 108 can initially be obtained from a general application content store associated with the mobile operating system of the client device 106. After the application 108 has been installed on the client device 106, the application 108 can be dynamically and automatically updated on the client device 106 such that its configuration can be changed over a period of time (e.g., between a time point $T_0$ and a time point $T_2$) without requiring a manual update from the application content store from which the application 108 was originally obtained from. More detailed descriptions related to techniques used to execute a dynamic update on the client device 106 are provided below with respect to FIG. 2.

Referring in more detail to each stage of the dynamic update process, at stage "A," the application 108 initially provides the interface 130 for output to the user 102. In the example depicted, the application 108 is configured as a shell application that initially generates the interface 130 as an initial version of the application. The interface 130 includes a general layout for content items for different topics (e.g., politics, weather, sports) without actually including electronic content that is provided to the user 102. In this regard, the interface 130 represents an application with a basic layout of minimal content that is, for example, provided after an application is executed onto the client device 106.

In one instance where the application 108 is a new application, the interface 130 includes incomplete interface elements where content that is to be obtained from the computing device 120 is to be included at a subsequent time period (e.g., during stages "E" and "F"). In this example, the interface 130 represents an initial configuration of the application 108 after installation on the client device 106. For instance, the interface 130 is displayed on the client device 106 prior to querying of content to be displayed on the client device 106.

The display of the interface 130 on the client device 106 may generally persist for a relatively short time (e.g., couple hundred seconds) until the application 108 has been able to establish communications with the computing device 120. For example, the interface 130 can be displayed on the front-end of the application 108 as the backend of the application performs processes related to stages "A" through "D" described in more detail below.

Although FIG. 1 illustrates an example of the application 108 being initially configured as a shell application, other configurations of the application 108 are also possible. The alternate configurations described below relate to the initial configuration of the application 108 (e.g., generation of the interface 130). Thus, after the interface 130 is generated, the alternate implementations may handle subsequent updates to application 108 in the same manner. In a second implementation, the application 108 is initially configured as a thin client application with a displayable icon to launch the application 108 as a landing page for when the application 108 is initially launched (e.g., with no content data or UI data). The application 108 further includes a URL that, upon receiving a user selection on the icon to launch the application, causes the client device 106 to display the landing page while simultaneously accessing, using the URL, the computing device 120 to obtain UI data and content data to be provided for display on the client device 106. The application 108 then executes a set of instructions to construct the UI data 124 and/or the content data 123 to render the user interface 140 with which the user 102 can interact to perceive and explore the received content. By way of example of this implementation, instead of providing the user interface 130 for output at stage "E," as discussed below, the application 108 instead provides a landing page that provides only a simple background graphic. As the landing page is rendered, stages "A" through "D" are executed as illustrated in the figure. At stage "E," the application 108 then uses the received content data 123 and the UI data 124 to generate the interface 140.

Alternatively, in a third implementation, the application is configured as a thin UI application that initially displays content that is locally stored on the client device from a prior application session. The application then exchanges communications with the computing device 120, as noted above, to obtain new content data 123 and/or UI data 124 included within the application object 122. The newly received content from the computing device 120 is then used to replace and/or adjust the content from the prior application session that is initially provided on the application. As an of this implementation, during an update iteration where the interface 150 represents an initial interface, content from a prior application session (e.g., the application 108 at stage "E" when the interface 140 is generated). Afterward, the application 108 then repeats the techniques performed between stages "A" to "D," as described below, except to obtain content data 123 that specifies new content that is not displayed on the user interface 150 at stage "F." The newly obtained content data 123 and UI data 124 are then used to dynamically adjust the interface 150 to generate another interface (not shown) that includes either new content not previously included in the interface 150, includes new user interface elements or a new interface structure not previously included in interface 150, or a combination of the two.

In some implementations, the exact configuration of the application (e.g., shell application, thin client application, thin UI application) can be time-dependable and updatable by virtue of the architecture of the system 100 being capable of dynamically configuring the application 108 without requiring changes to the application code. In the example illustrated in FIG. 1, the transition between the interface 130 and the interface 140 represents the application 108 being configured to operate as a shell application (e.g., providing an initial interface that does not include any content), followed by an updated interface where content is populated into the initial interface. In addition, the transition between interface 140 and the interface 150 instead represents the application 108 being configured to operate as a thin UI application (e.g., initially providing stored content from a prior session). In this regard, the application 108 operates both as a shell application and a thin UI application between time points $T_0$ to $T_2$, At stage "B," the client device 106 transmits the request 109 over the network 110 to the computing device 120. The transmission of the request 109 can be initiated based on determining that the application 108 has been recently launched on the client device 106. In some instances, other associated events can also be used to trigger the transmission in addition to the recent launch of the application 108. For example, certain actions performed by the user 102 on a social media network (e.g., posting a new status, uploading or sharing content, downloading content) can also be used to trigger the transmission of the request 109.

The request 109 can include identification information associated with the client device 106. The request 109 can also include data associated with the interface 130 such as user input data provided on the user interface 130, context data associated with the user 102, data recently entered on the application 108, or other types of user activity data associated with other applications running in the background of the client device 106. The request 109 can also include data associated a current version of the application 108 at the time point $T_0$. For example, the request 109 can include a current version of the application, application objects 122 that were previously provided over the network 110 (if the application was previously updated), or a request for specific application objects 122 (e.g., content data 123 or UI data 124) requested to be included on application 108 but not presently included on the interface 130.

At stage "C," in response to receiving the request 109, the computing device 120 identifies and obtains application objects 122 from storage associated with the computing device 120. The computing device 120 can include multiple logical components (e.g., different software modules of a server system) or different physical components (e.g., different servers communicating over a secure network). For example, the computing device 120 can include a web server that exchanges data communications with the client device 106 over the network 110, a content management server that stores various types of application content 122, and a database server that stores various types of instructions, protocols, or configurations related to data transmissions over the network. The application object 122 can be obtained by the computing device 120 by initially querying a database server, which in turn, retrieves or otherwise obtains the application object 122 from the content management server, and provides the obtained application objects 122 to the computing device 120 in response to its submitted query. More particular descriptions related to the backend of the system 100 (e.g., the computing device 120) are provided below with respect to FIGS. 4A and 4B.

As described above, the application objects 122 includes content data 123 and UI data 124. The content data 123 includes and/or provides reference to (e.g., through URLs) content that is to be presented on through the user interface of the application 108. Examples of content data 123 include textual content (e.g., electronic articles, documents, search results, document snippets), or graphical content (e.g., pictures, videos, audio snippets). The UI data 124 includes configurations and/or instructions that control the arrangement or presentation of the content data 123 and/or specifies techniques by which the user 102 can interact with the content data 123 (e.g., by providing touch selection, by use of touch gestures, providing a click using a cursor object, etc.).

At stage "D," the computing device 120 transmits the application object 122, obtained in response to the received request 109, to the client device 106 over the network 110. The computer device 120 may additionally transmit device-specific instructions, protocols, or specifications that enable the client device 106 to interpret and implement the received application objects 122 into a current version of the application 108.

At stage "E," the client device 106 dynamically updates the application 108 using the contents of the application objects 122 (e.g., the content data 123 and the UI data 124) and based on update instructions included within the application objects 122. As described above, the client device 106 can implement the instructions in such a manner that, the application objects 122 can be incorporated into the application 108 without reconfiguring the entire application package associated application 108. For example, the application 108 can be configured such that only a portion of its configuration that is relevant to the application objects 122 can be updated.

In addition, the client device 106 may incorporate the application objects 122 without necessarily terminating an active instance of the application that is presently executing on the client device 106 when the client device 106 receives the application objects 122. The client device 106 may execute the dynamic update as a background application process such that an update can take place simultaneously as the user 102 currently uses the application 108. In such instances, the dynamic update by the application 108 can be performed automatically without user intervention and in a manner that does not significantly disrupt a user experience on the application 108 or other application presently running on the client device 106 when the application objects 122 are received by the client device 106. As an example, updates to the application 108 may be performed incrementally based on the activity of the user 102 on the application 108 (e.g., updating pages for application pages that are not presently being accessed by the user while the user 102 is presently viewing a different page). In another example, the client device 106 may temporarily wait until the application 108 is detected to be running in the background, when the update using the application objects 122 can take place.

In the example depicted, the client device 106 dynamically updates the application 108 at a time point $T_1$ such that the interface 130 is adjusted to generate the interface 140 using the application objects 122 received from the computing device 120. As shown, content item for a breaking news content item (e.g., the text segment "NASA LUNAR ROVER SAFELY LANDS ON MOON") in inserted into an interface element placed under the header text "BREAKING NEWS." In addition, a hyperlink (e.g., "PARTY LEADERS MEET") and a corresponding graphic is inserted into the interface element for the "POLITICS" topic section, weather information for San Diego (e.g., "74 SUNNY") is inserted into the "WEATHER" topic section, and a final score for a recently ended hockey match (e.g., "WSH" vs. "PIT") is inserted into the "SPORTS" topic section. In this example, the content that is displayed is included within the content data 123 of the application object 122.

In the example above, the initial adjustment of the application 108 to generate the interface 140 at the time point $T_1$ is performed by the client device 106 automatically in response to receiving the application objects 122 from the computer device 120. For instance, the adjustment is performed before the client device 106 detects the occurrence of a specified event as described above (as opposed to the update to generate the interface 150 described in more detail below). In this regard, generation and presentation of the interface 140 represents an example of an automated instantaneous update to the application 108.

At stage "F," the client device 106 performs a second update to the application 108 in response to detecting an occurrence of a specified event. As described above, an event can refer to a one or more triggers and/or conditions, the satisfaction of which, causes the client device 106 to automatically update the application 108. For example, an event may relate to a satisfaction of a condition specifying a threshold time period in which the application 108 has been running as a background application on the client device 106. In another example, an event may be determined to occur if the user 102 provides a specified input on the application 108. In yet another example, an event may relate to sensor data, or other types of data independent from the application 108, to indicate that activity of the client device 106 is minimal (e.g., data indicating that screen of the client device 106 is turned off). In this example, the occurrence of an event can be used to execute the second update such that the update does not disrupt (or at least poses minimal impact on) a user's present usage of the client device 106.

In some implementations where the client device 106 performs sequential updates, the second update can be performed based on the same data package as the one received from the computer device 120 to perform the first update at stage "E." For example, as described above, one portion of the data package (e.g., the content data 123) can be used to perform the first update, whereas another portion of the data package (e.g., the UI data 124) can be used to perform the second update. Alternatively, in other implementations, the client device 106 may instead repeat stages "A" through "D" prior to performing the second update at stage "E." In this example, the client device 106 instead uses two separate data packages to perform each respective update.

In some implementations, specific portions of the application objects 122 can be implemented at discrete time points based on the occurrence of specified events. For example, a particular piece of content within the application object 122 that is associated with a high urgency (e.g., breaking news segment) can be incorporated immediately after the application objects 122 are received by the client device 106, whereas another, less time-sensitive piece of content (e.g., low priority local news segment) can be incorporated at later, designated time point. In another example, content data 123 can be incorporated into an existing user interface configuration of the interface 130 while the UI data 124 is temporarily stored and incorporated at a later time point. In each of these examples, the portions of the application objects 122 that are not immediately used to update the application configuration can be temporarily stored in an application cache. The stored portions can then be used to subsequently update the application 108. In some implementations, the application can be updated while the application remains active and without having to terminate or restart the application.

In the example depicted, the client device 106 adjusts the user interface elements, the arrangement of content, and the display of the content within the interface 150 relative to that of the interface 140. This is contrast to the first update performed at stage "E" where the client device 106 adjusts only the content that is displayed but not other top-level features of the application 108. For example, the interface 150 includes view tabs for topics "POLITICS," "WEATHER," and "SPORTS (as opposed to segmented topic sections included within interface 140). In addition, the interface 150 also includes an increased font size and thickness for the text segment "PARTY LEADERS MEET," as well as an increased size for the picture previously included within the "POLITICS" topic section. In addition, the interface 150 also includes a user-selectable button (e.g., with the label "READ MORE"), which was not previously displayed on the interface 140.

A comparison of the updates performed by the client device 106 in stages "E" and "F" illustrates updates that are performed based on the content data 123 and the UI data 124, respectively. For example, as described above, only the content data 123 within the application object 122 is used to generate the interface 140 since there are no changes to the interface elements or the arrangement of content relative to that of the interface 130. In addition, only the UI data 124 is used to generate the interface 150 since there are no changes to the content that is provided for display relative to that of the interface 130.

In addition, the interface 150 is generated such that an application-wide update to the entire application 108 (e.g., through a content store update) is not necessary. In addition, because the arrangement of the content is varied relative to the arrangement in a prior instance of the application 108 (e.g., the interface 140), such an update can also be performed without obtaining further instructions and/or configurations from the computer device 120 after initially obtaining the application object 122 at stage "D." In this regard, a single data transmission between the client device 106 and the computer device 120 can be used to effectuate multiple updates to generate different application interfaces (in contrast to causing multiple updates to a webpage, which require multiple data transmissions between client device and a web server).

To summarize, the architecture of system 100 can be used in a variety of applications to improve the user experience, interactivity, operation, and configuration of the application 108 in providing access to time-sensitive information. In one particular application, the interaction between the client device 106 and the computer device 120 can be used to generate a time-sensitive representation that coincides with a major event that may be of interest to the user 102. For example, during the World Series between fictional team A and fictional team B, the application 108 can be temporarily updated to reflect a specific collection of content (e.g., team logos, player statistics) and specific UI arrangement (e.g., interfaces for each opposing team) that coincide events that transpire as the World Series progress. For example, if team A wins the first game, then the application 108 can be adjusted to provide a collection of content within a specific UI arrangement that is specific for team A. If team B then wins the second game, then the application can be adjusted to provide another collection of content within another UI arrangement that is specific for team B. Once the series match has terminated (and therefore no longer relevant to the user), the application 108 can be adjusted entirely to a more generic sports application that provides content for sports other than just baseball.

Although a news reader application is illustrated in the figure for the sake of clarity, the system 100 can be used to configure and update any type of mobile application that provides the user 102 with access to time-sensitive and/or time-dependable electronic content. As another example, the application 108 can be a digital text reading application that provides users with access to articles, posts, or blogs that change over time due to news developments. In another example, the application 108 is a sports-related application (e.g., fantasy football app, score-reporting app) where content such as sports scores, statistics, articles, images, or videos adjust over time. In yet another example, the application 108 can be a social network and/or a social network companion application that provides users with updates related to posts of users or other types of interactions for a collection of users. In another example, the application 108 can also be an e-commerce or online marketplace application that provides users with updates related to orders, online inquiries, among other types of purchase-related data.

In some implementations, a dynamic update can include a specified delay in executing a change to the application 108 after receiving a corresponding application objects 122 from the computing device 120 for the update. For example, the client device 106 may store the application objects 122 in storage for a specified time period (e.g., until a specified event has taken place). As described above, the client device 106 may also receive different application objects 122 for different dynamic application updates on a periodic basis. Thus, in some instances, the client device 106 may receive application objects 122 for a new application update prior to the execution of a preceding application update that has corresponding application objects 122 stored on the client device 106. In such instances, the application 108 may use techniques to prioritize the execution of the multiple application updates to be performed. For example, each dynamic application update can be associated with a prioritization score that indicates an urgency associated with executing the update. In another other example, the second received application update can be disregarded in order to prioritize the first received application update. In yet another example, the first received application update can be disregarded in order to prioritize the subsequently received application update.

Figure 2:
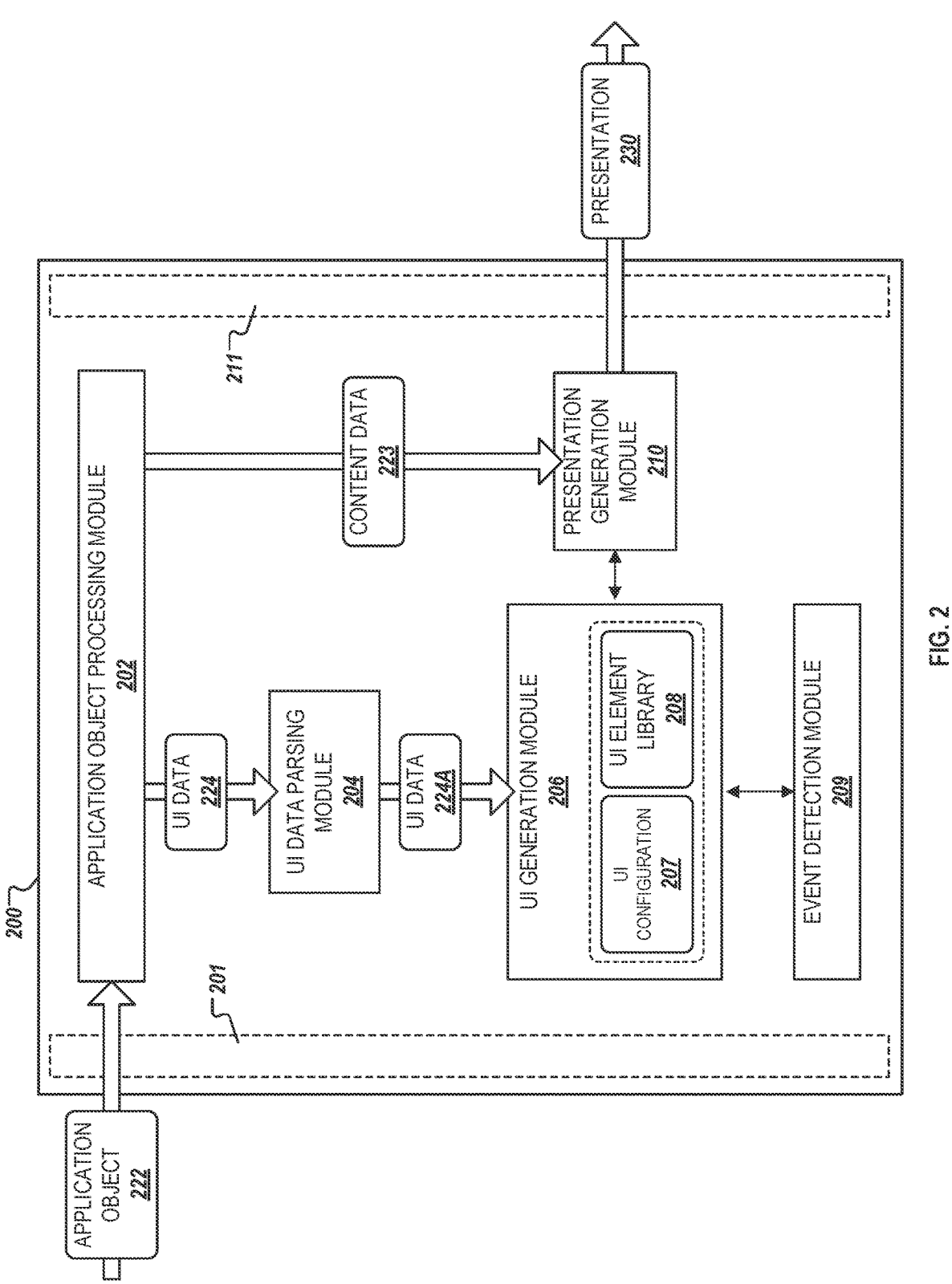
FIG. 2 illustrates a block diagram of a client device that is capable of executing dynamically adjusted native applications.

FIG. 2 illustrates a block diagram of a client device 200 that is capable of executing dynamically adjusted native applications. The client device 200 includes an application object processing module 202, a UI data parsing module 204, a UI generation module 206, an event detection module 209, and a presentation generation module 210. In some instances, the client device 200 illustrated in FIG. 2 can represent the client device 106 illustrated in FIG. 1.

The module 202 initially receives application object 222 (e.g., the application object 122 illustrated in FIG. 1) from one or more computing devices (e.g., the computing device 120 illustrated in FIG. 1) through a communication interface 201. The communication interface 201 can represent a network interface that enables the client device 200 to exchange data communications such as receiving the application object 22 from an associated application server (e.g., the computer device 120 illustrated in FIG. 1). The module 202 initially parses the contents of the application object 222 to identify different data components such as the UI data 224 and the content data 223. As described above with respect to FIG. 1, the UI data 224 includes data relating to the user interface elements to be included on an application to be adjusted (e.g., the application 108 at stage "E" as illustrated in FIG. 1), one or more specified arrangements of content that is included within the content data 223, and/or other types of configuration and protocol information relating to a user interface of the application to be adjusted. In contrast, the content data 223 includes one or more pieces of electronic content that is provided for display on the user interface of the application to be updated. For example, the content data 223 includes textual content and/or graphical content.

In some implementations, the module 202 may optionally extract and process execution instructions for performing an update to a new application (e.g., the application 108 at stage "D") or an existing application (e . . . , the application 108 at either stage "E" or "F"). The execution instructions can specify, for example, a list of events, the satisfaction of which causes the client device 200 to automatically initiate the dynamic update process (e.g., updating the interface 130 to generate the interface 140, or updating the interface 140 to generate the interface 150). In another example, the execution instructions can specify specific usage conditions that are indicative of minimally disruptive time points for executing a dynamic update of an application (e.g., a threshold time period for which the application has been running as a background process on the client device 200, data indicating minimal user activity on a particular page or area of an application that is identified as requiring an update). In such implementations, the execution instructions that are extracted by the module 202 can be run as background processes on the application such that specified conditions are periodically monitored in order to enable the client device 200 to automatically identify a suitable time point to execute a dynamic update.

The module 204 then processes the UI data 224 received from the module 202 in order to extract device-specific UI configuration information included within the UI data 224A. As described above, in some implementations, the UI data 224 includes UI-related data for different types of client devices (e.g., smart phones, tablets, notebooks) that each run different types of operating systems (e.g., mobile operating systems, desktop operating systems). The module 204 thus identifies hardware and software-related information associated with the client device 200 and then extracts the applicable the appropriate data for the device type and operating system, which is then provided to module 206 as the UI data 224A.

The module 206 then constructs a new user interface for the application to be updated based on device-specific data included within the UI data 224A. The module 206 initially accesses UI configuration data 207 and UI element library 208 stored on the client device 200 (e.g., application storage). The UI configuration data 207 includes instructions that were used to configure prior instances of the application (e.g., UI data used to generate user interfaces associated with prior versions of the application). The UI element library 208 represents a repository of user interface elements (e.g., buttons, fields, forms, icons, background patterns) that are used to generate different interfaces for the application. In some instances, the UI element library 208 includes alternative objects for the same user interface elements such that the module 206 can construct various alternative interfaces for presenting the same underlying content (e.g., the user interface 140 and the user interface 150 that both display the same content in different interface formats).

The module 206 constructs a new user interface by executing instructions specified within the UI data 224A, which references specific UI elements included within the UI element library 208. For example, the module 206 identifies references to particular UI elements within the UI data 224A and then selects the corresponding UI elements from the UI element library 208. In some implementations, if the UI data 224A specifies a construction of a new interface that has similar or a duplicate features compared to a previously generated interface, then the module 206 obtains cached UI data associated with the previously generated interface from the UI configuration data 207. For example, referring back to the interfaces 140 and 150 depicted in FIG. 1, the title section, which includes the "NEWS APP" text segment, and the "BREAKING NEW" section within the interface 150 is identical to the corresponding sections within the interface 140. In this example, instead of generating a duplicate copy, the module 206 instead accesses the pre-configured UI data for the interface 140 within the UI configuration data 207 in order to construct the same sections.

The module 126 also compares instructions specified by the UI data 224A and log data relating to previously executed instructions stored within the UI configuration 207 in order identify the portions of the interface to be generated that represent new UI elements relative to a previously configured user interface. For example, referring back to the interfaces 140 and 150 depicted in FIG. 1, the topics "POLITICS," "WEATHER," and "SPORTS" are represented as sections in the interface 140, whereas the same topics are represented as tabbed views in the interface 150. In the example, the module 126 determines that the tabbed views specified in the UI data 224A represents a new UI configuration relative to the configuration of the interface 140.

The event detection module 209 operates as a background process on the client device 200 to detect the satisfaction of specified conditions or triggers specified within the UI data 224A. For example, the event detection module 209 may monitor whether the application is being used as an active process or a background process, track a set of usage statistics relating to user input on the application, or monitor sensor data indicating the overall usage of the client device 200. Upon determining that at least one of the triggers or conditions specified within the UI data 224A has been satisfied by the monitored data, the event detection module

209 sends a corresponding transmission to the UI generation module 206 to initiate the generation of a new user interface specified by the UI data 224A. For example, the UI data 224A can specify that the generation of a new user interface should be executed at a time point when the application is either executed as a background process or is not currently running on the client device 200. As an example, in response to determining that the application has been inactive for more than five minutes, the module 209 may determine that an associated condition specifying a five-minute threshold of inactivity has been satisfied. In response, the event detection module 209 transmits an indication to the UI generation module 206 that the associated condition has been satisfied, and in response, the module 206 initiates the generation of the new user interface as specified by the UI data 224A.

Once the module 206 has completed generating the user interface specified by the UI data 224A, the newly generated user interface is then transmitted to the module 210. The module 210 also receives the content data 223 from the module 202. In some implementations, the processing of the content data 223 by the module 202, and the generation of a new user interface by the UI generation module 206 are performed in parallel in order to reduce the time frame required complete the dynamic update of the application.

Alternatively, in other implementations, the processing of the content data 223 and the generation of the new user interface is instead performed sequentially to reduce the total amount of computational resources necessary to complete dynamic update. In other implementations, the particular technique employed can be based dynamically determined based type of update to be performed. In one example where an update is configured to be performed while the user is presently using the application, a sequential processing technique for the content data 223 and the UI data 224 may be used to reduce the amount of memory and/or CPU usage in executing the update, which can potentially disrupt the user's experience while using the application. In another example where the update is configured to be performed when the application is presently running as a background process, a parallel processing technique for the content data 223 and the UI data 224 may instead be used to reduce the overall time required to execute and complete the update, which may potentially slow down the wakeup of the application when the user attempts to re-enter the application for active use.

After receiving the generated user interface from the module 206 and the content data 223 from the module 202, the module 210 then generates a presentation 230 for output through an interface 211 of the client device 200. The presentation 230 represents a configured front-end view of the user interface that is displayed to the user. The module 210 generates the presentation 230 by inserting pieces of content included within the content data 223 within locations within a general layout of the newly configured interface specified by the UI configuration instructions included within the 224A. For example, the structure of the newly generated interface can resemble the structure of the interface 130 illustrated in FIG. 1, which does not include any items of content. Once the module 210 completes generating the presentation 230, the structure of the presentation 230 can resemble the structure of the interface 140, which shares the same layout as the interface 130 but has content items that have been inserted into sections corresponding to topics relating to the content items (e.g., weather forecast data being inserted into a "WEATHER" section of the interface 130). Once the module 210 completes generating the presentation 230, the presentation 230 is then rendered and provided for output on the user interface 211.

FIG. 3 illustrates an example of a process 300 for dynamically adjusting native applications that are executed on various client devices. Briefly, the process 300 can include accessing a first set of instructions for generating a user interface of an application (302), receiving a first set of content data an data indicating a second, different set of instructions (304), presenting content indicated by the first content data through a first version of the application generated using the first set of instructions (306), determining that a particular event associated with the application has occurred (308), and presenting content indicated by the first content data through a second, different version of the user interface using the second set of instructions (310). For clarity, the various steps included within the process 300 are described in reference to the example depicted in FIG. 1.

In more detail, the process 300 can include accessing a first set of instructions for generating a user interface of an application (302). For instance, as illustrated in FIG. 1, the client device 106 accesses a first set of instructions (e.g., instructions for generating the interface 140 at stage "E") in a transmission (e.g., a data package that includes the application object 122) over the network 110 from the computing device 120.

The process 300 can include receiving a first set of content data and data indicating a second, different set of instructions for generating a user interface (304). For instance, while or after the client device 106 has accessed the first set of instructions as described above in step 302, the client device 106 may receive a transmission from the computing device 120 over the network 110. The transmission includes a first set of content data (e.g., the content data 123 received at stage "E") indicating content that is be presented through the user interface the user interface 140 of the application 108. The transmission also includes data indicating a set of instructions (e.g., instructions to generate the interface 150 at stage "F") to generate a second version of the user interface 140 (e.g., the interface 150) that is different from the first version of the interface 140 (e.g., the interface 140 as configured at stage "E").

The process 300 can include presenting content indicated by the first content data through a first version of the application generated using the first set of instructions (306). For instance, after receiving the first set of content data and and the data indicating the second set of user interface generation instructions as described above in step 304, the client device 106 uses the first set of content data and the first set of instructions to present, as output of the client device 106, content through the first version of the user interface 140 of the application 108. For example, as illustrated in FIG. 1, such content can include the text segment "NASA LUNAR ROVER SAFELY LANDS ON MOON," an article with the topic "PARTY LEADERS MEET," weather information for "SAN DIEGO," and a final score of an NHL hockey game between "WSH" and "PIT."

The process 300 can include determining that a particular event associated with the application has occurred (308). For instance, while or after using the first set of content data or the first set of instructions to present content through the first version of the user interface 140 of the application 108 as described above in step 306, the client device 106 then determines that a particular event associated with the application has occurred. In the example depicted in FIG. 1, the particular event can refer to the application 108 being executed as a background process on the client device 106 for a time period that exceeds a predetermined threshold time period (e.g., a time period between the time point $T_1$ for the interface 140 and the time point $T_2$ for the interface 150). In another example, the particular event can refer to the user providing a user input on the interface 140 that indicates a preference for content associated with the "POLITICS" topic relative to the other topics provided for display on the application 108.

The process 300 can include presenting content indicated by the first content data through a second, different version of the user interface using the second set of instructions for generating a user interface (310). For instance, in response to determining that the particular event associated with the application has occurred as described above in step 308, the client device 106 uses the first of content data (e.g., the content data 123 at stage "E") and the second set of instructions (e.g., instructions to generate the interface 150) to present, as output of the client device 106, content through the second version of the user interface 140 (e.g., the user interface 150) of the application 108. As described throughout, this change in version can be performed without requiring an entire application from a content store from which the application was obtained and installed on the client device 106, or without requiring an active instance of the application 108 on the client device 106 from being terminated. This is accomplished by processing the second set of instructions as an incremental update to the application 108 (as opposed to an application package update) that reconfigures the arrangement of content provided on the second version relative to the that of the first version. It should be further noted that this change can be effectuated using a single transmission from the computing device 120 (e.g., a data package that includes both the content data 123 and the instructions to generate the interface 150) without requiring multiple sequential transmissions for each version update to a user interface of the application 108.

Figure 4A:
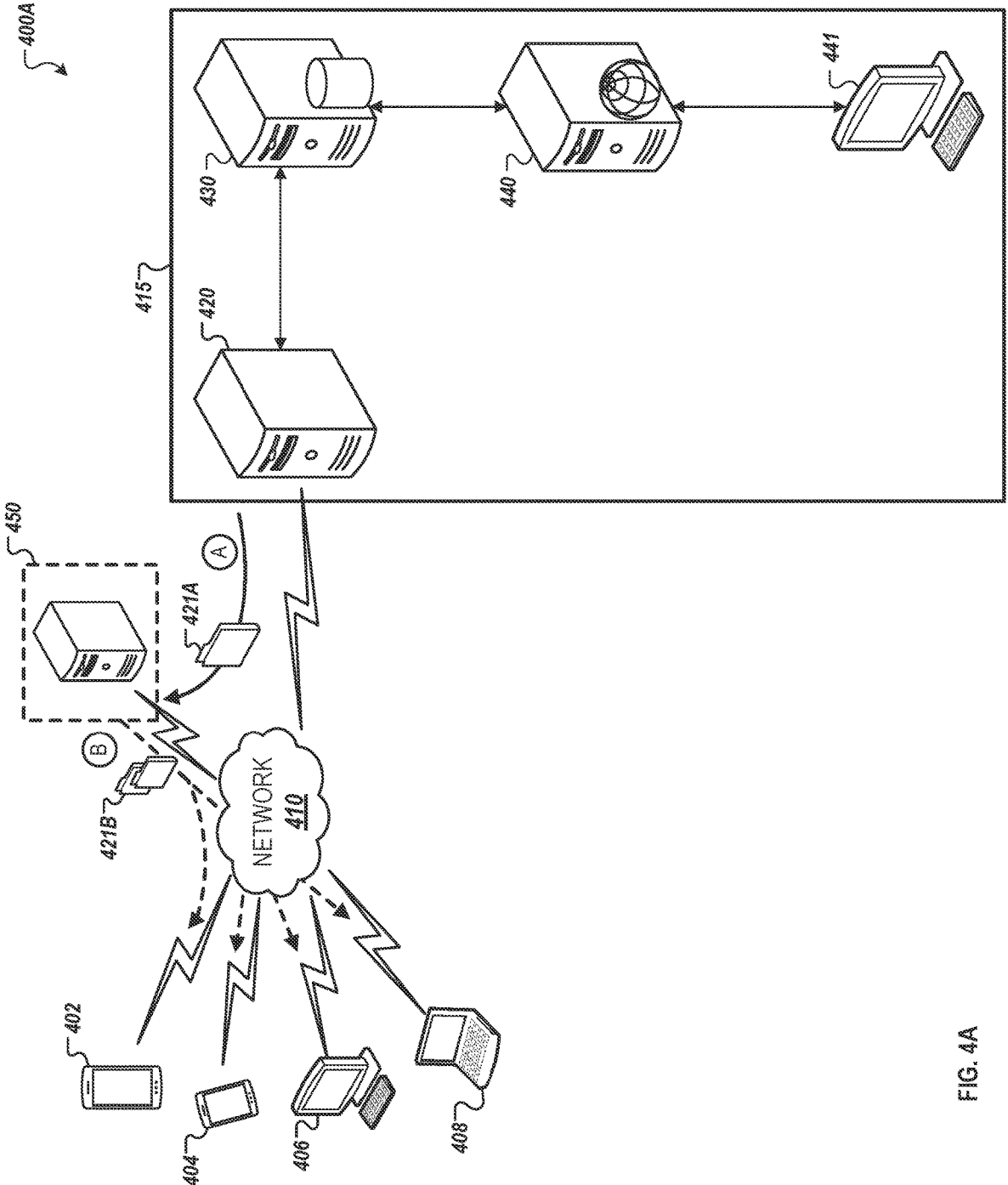
FIG. 4A illustrates an example of a conventional application publishing system used to statically configure updates for client devices.
Figure 4B:
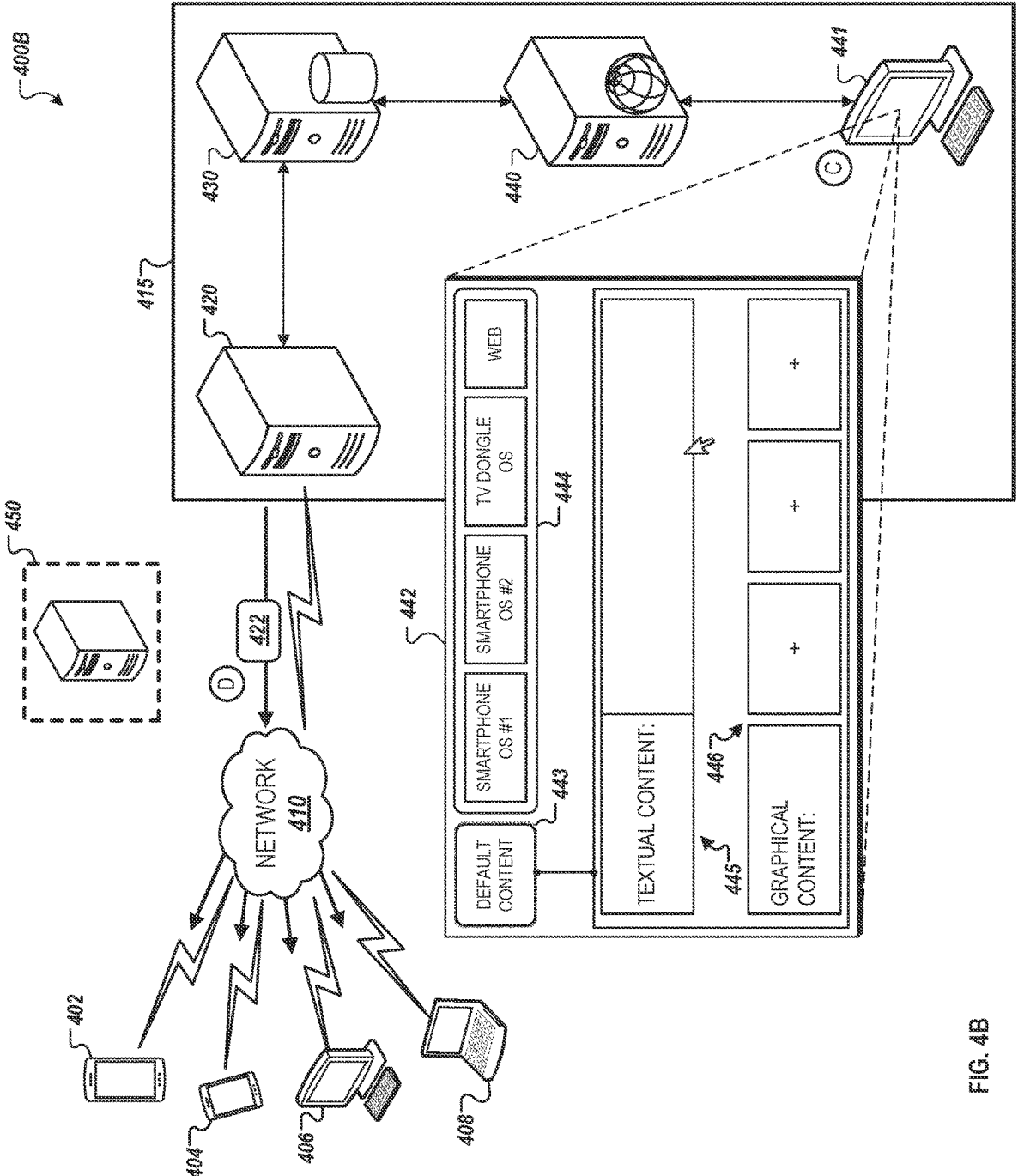
FIG. 4B illustrates an example of a publishing system that is capable of dynamically configuring and adjusting native applications that run on various client devices.

FIGS. 4A and 4B illustrate an example of an application publishing system 400 that is capable of dynamically configuring and adjusting native applications that run on various client devices. FIG. 4A illustrates a process by which an application (e.g., the application 108 illustrated in FIG. 1) is installed on client devices 402, 404, 406, and 408 over a network 410 from an application content store server 450. FIG. 4B illustrates a process by which the application installed on the client devices 402, 404, 406 and 408 in FIG. 4A is dynamically configured and/or updated over the network 410 by a computing system 415. In some instances, the computing system 415 can be the computing device 120 illustrated in FIG. 1. The illustrated processes in FIGS. 4A and 4B are represented as a sequence of stages, which are depicted with letters "A" to "D" in the figures.

Referring initially to the components of the system 400, the client devices 402, 404, 406, and 408 represent different types of client devices that are capable of executing native applications that run on a corresponding operating system associated with each device. As an example, client devices 402 and 404 may run mobile operating systems, whereas the client devices 404 and 408 may run desktop operating systems. In some implementations, one or more of the client devices 402, 404, 406 or 408 may correspond to the client device 106 described above with respect to FIG. 1.

The computing system 415 includes a web server 420, a database server 420, a content management server 440, and an administrator device 441. The web server 420 may communicate with each of client devices 402, 404, 406, and 408 over the network 410 using one or more network protocols, including, but not limited to, Hypertext Transfer Protocol ("HTTP"), File Transfer Protocol ("FTP"), Remote Procedure Call ("RPC"), or other protocols. Client devices 402, 404, 406, and 408 may include mobile computing devices, personal digital assistants, cellular telephones, smart-phones, tablets, laptop, desktop, workstation, and other computing devices.

The web server 420 and client devices 402, 404, 406, and 408 may, for example, be remotely located. The web server 420 is configured to deliver application content to client devices 106. Such application content may, for instance, be provided to the web server 420 by one or more database servers 430 that are maintained by the content management server 440. In some implementations, the web server 420 and database server 420 are located at a same premise (e.g., a data processing center).

The content management server 440 may provide its users (e.g., editors, developers, etc.) with interfaces and sets of tools that can be used to create and modify mobile applications. Examples of the interfaces and tools provided to users of the CMS are illustrated in the configuration interface 442. Each version of the mobile application developed at the content management server 440 may be stored in the form of one or more application content objects. Such application content objects may be stored in one or more databases, such as those associated with database server 430.

In some examples, the interface provided by the content management server 440 may resemble or operate in cooperation with one or more other interfaces that can be used for creating and modifying content for other mobile applications and/or websites. In some implementations, content conveyed in the application content objects may include or reference content associated with a website. Such a website may, for instance, be managed in tandem with the mobile application by users of the content management server 440.

In some implementations, the network 410 includes one or more networks, such as a local area network, a wide area network, and/or the Internet. One or more of the networks in the network 410 may be wireless, such as a cellular telephone network or a Wi-Fi network.

Referring now to FIG. 4A, a process by which an application (e.g., the application 108 illustrated in FIG. 1) is installed on client devices 402, 404, 406, and 408 over a network 410 from an application content store server 450 is illustrated. At stage "A," application data 421A (e.g., configuration files) are transmitted to content store server 450. At this stage, applications that are configured by an administrator (e.g., application developer, content provider, etc.) are submitted for publishing on a content store associated with the application content store server 450. For example, an administrator may use an interface such as the configuration interface 442 to design and configure an application (e.g., the application 108) to be published for download through the content store associated with the application content store server 450. An organization that manages the content store server 450 then approves the application for publishing on the content store. Once published on the content store, users associated with the client devices 402, 402, 404, 406, and 408 can download and install the application onto a corresponding client device.

At stage "B," after a client device has requested to download the application from the content store server 450, an application file 421B associated with the application is then transferred from content store server 450 to the client devices 402, 404, 406 and 408 through the network 410.

Referring now to FIG. 4B, a process by which the application installed on the client devices 402, 404, 406 and 408 in FIG. 4A is dynamically configured and/or updated over the network 410 by a computing system 415 is illustrated. At stage "C," an administrator can either configure a new application to be published on the content store server 450, or adjust and existing application that has been installed on one or more of the client devices 402, 404, 406, or 408. In the first instance, the administrator may specify top-level settings for the application using the configuration interface 442. As depicted, the administrator can select default content 443 to provide for output on the application. Examples of default content include textual content 445 (e.g., documents sourced from an external web source) and graphical content 446 (e.g., multimedia files associated with the textual content 445). Other examples of electronic content are discussed above with respect to the content data 123 described above with respect to FIG. 1.

In general, the configuration interface 442 can be used by an administrator to configure updates to an application without having to seek approval to publish the update through the content store server 450 by a third-party organization that manages its associated content store. For example, the configuration interface 442 provides the administrator with a larger degree of control compared to typical application development systems in configuring dynamic updates to an application without having to submit configured updates for approval by the third-party organization that manages the electronic content store. The configuration interface 442 enables the administrators to make adjustments using a user-friendly interface (e.g., adding or removing pieces of content, changing the structure of a user interface) rather than having to adjust the application code directly.

In the second instance, the administrator may adjust one or more previously configured settings for an existing or prior version of the application. For example, the administrator may adjust the content to be displayed on the application. Referring back to the example of the news reader application illustrated in FIG. 1, the administrator may adjust the articles that are viewable by the user 102 on the application 108 for a particular topic. In another example, the administrator may also adjust the arrangement of the content provided on the application. For instance, the order of topics displayed on the application 108 can be adjusted such that topics that are more relevant to a milestone event can be prioritized over topics that provide general information. In yet another example, the administrator may also adjust the way in which a user interacts with content that is provided on the application. For instance, the administrator may adjust a particular type of user interface element used to display a piece of content on a user interface of the application 108. In yet another example, the administrator may adjust other types of presentation elements of the application 108 (e.g., adjusting an order in which a sequence of content is provided, setting triggers for displaying pieces of content in response to receiving specified user inputs).

Once the administrator finalizes an application configuration (e.g., a first configuration for a new application or an updated configuration for an existing application) on the configuration interface 442, application objects 422 (e.g., content data 123 and UI data 124) indicated by the application configuration are then obtained from storage associated with the database server 430 or content management server 440 and provided to the web server 420.

At stage "C," the web server 420 transmits the application objects 422 to one or more of the client devices 402, 404, 406, or 408 over the network 410 in a similar manner as the computing device 120 transmitting the application objects 122 as described previously with the respect to FIG. 1. The application objects 422 can include configuration and/or execution instructions that enable the client devices 402, 404, 406, and 408 to dynamically adjust the existing configuration of the application. For example, as described above, an application update based on the application objects 122 can update a version of the application without necessitating an entire update from the content store server 450.

Figure 5:
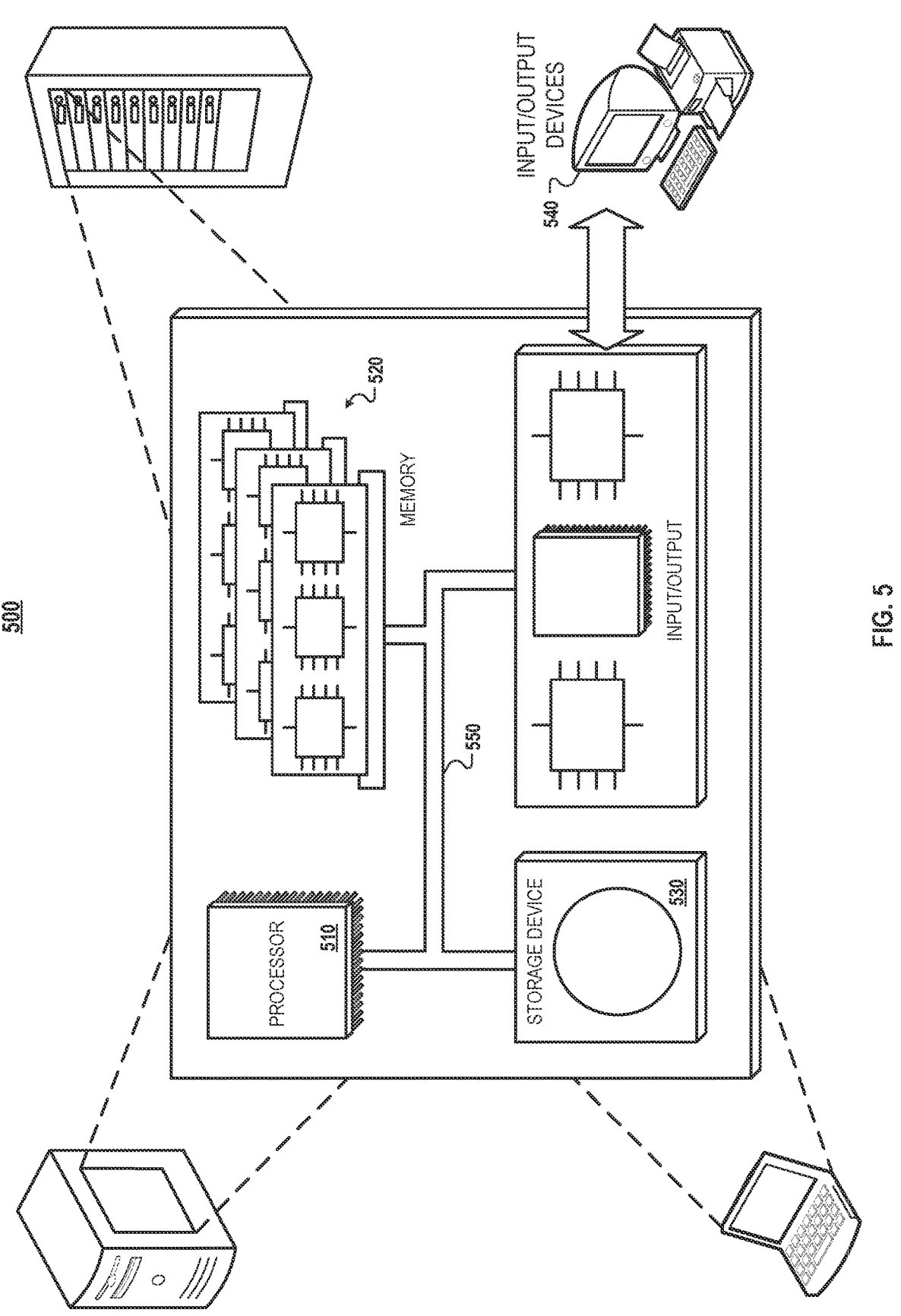
FIG. 5 is a block diagram of computing devices on which the processes described herein, or portions thereof, may be implemented.

FIG. 5 is a block diagram of a computing system 500 on which the processes described herein, or portions thereof, may be implemented. The system 500 can be used for the operations described in association with FIG. 1 according to some implementations. The system 500 may be included in the system 100.

The system 500 includes a processor 510, a memory 550, a storage device 530, and an input/output device 540. Each of the components 510, 550, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 550 or on the storage device 530 to display graphical information for a user interface on the input/output device 540.

The memory 550 stores information within the system 500. In one implementation, the memory 550 is a computer-readable medium. In one implementation, the memory 550 is a volatile memory unit. In another implementation, the memory 550 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method comprising:

accessing, by a client device, a first set of instructions for generating a first version of a user interface of an application that is running on the client device;

while or after accessing the first set of instructions, receiving, by the client device in a transmission over a network from a computing device, (i) a first set of content data including first prioritization score content and second prioritization score content that is to be presented through the user interface of the application, and (ii) second data indicating a second set of instructions for generating a second version of the user interface of the application that is different from the first version of the user interface of the application, wherein the first prioritization score content is generated at the second version of the user interface before second prioritization score content;

after receiving the first set of content data and second data indicating the second set of instructions, using the first set of content data and the first set of instructions to present, as first output of the client device, content through the first version of the user interface of the application;

while or after using the first set of content data and the first set of instructions to present content through the first version of the user interface of the application, determining, by the client device, that a particular event associated with the application has occurred, wherein the content is presented at a first location relative to a location of the first version of the user interface; and in response to determining that the particular event associated with the application has occurred, using the first set of content data and the second set of instructions to present, as second output of the client device, content through the second version of the user interface of the application, wherein the second set of instructions provide instructions to:

display, at a second location, user interface elements through the second version of the user interface based on a comparison between the first set of instructions and the second set of instructions, wherein: (i) the user interface elements are displayed at the second location relative to a location of the second version of the user interface, (ii) the first set of content data including content that was previously provided for output for a prior session of the application, and (iii) wherein the second location relative to the second version of the user interface is different from the first location relative to the first version of the user interface.

2. The computer-implemented method of claim 1, wherein receiving, by the client device, (i) the first set of content data indicating content that is to be presented through the user interface of the application, and (ii) the second data indicating the second set of instructions for generating the second version of the user interface of the application that is different from the first version of the user interface of the application comprises:

receiving, by the client device, a data structure associated with the application that is running on the client device, the data structure including (i) the first set of content data indicating content that is to be presented through the user interface of the application, and (ii) third data indicating a second set of instructions for generating a second version of the user interface of the application that is different from the first version of the user interface of the application.

3. The computer-implemented method of claim 1, further comprising:

wherein using the first set of content data and the first set of instructions to present content through the first version of the user interface of the application comprises:

determining that the first set of instructions specify that the first version of the user interface is to include a first arrangement of user interface elements;

based on determining that the first set of instructions specify that the first arrangement of user interface elements are to be included in the first version of the user interface, generating, by the client device, the first version of the user interface including the first arrangement of user interface elements; and wherein using the first set of content data and the second set of instructions to present content through the second version of the user interface of the application comprises:

determining that the second set of instructions specify that the second version of the user interface is to include a second arrangement of user interface elements that is different from the first arrangement of user interface elements; and based on determining that the second set of instructions specify that the second arrangement of user interface elements are to be included in the second version of the user interface, generating, by the client device, the second version of the user interface including the second arrangement of user interface elements.

4. The computer-implemented method of claim 3, wherein determining that the first set of instructions specify that the first version of the user interface is to include the first arrangement of user interface elements comprises:

determining that the first set of instructions specify that the first version of the user interface is to include a first set of one or more user interface elements; and wherein determining that the second set of instructions specify that the second version of the user interface is to include the second arrangement of user interface elements comprises:

determining that the second set of instructions specify that the second version of the user interface is to include a second set of one or more user interface elements that are different from the first set of one or more user interface elements.

5. The computer-implemented method of claim 3, wherein determining that the first set of instructions specify that the first version of the user interface is to include the first arrangement of user interface elements comprises:

determining that the first set of instructions specify that the first version of the user interface is to include one or more user interface elements at each location in a first set of one or more locations on the user interface; and wherein determining that the second set of instructions specify that the second version of the user interface is to include the second arrangement of user interface elements comprises:

determining that the second set of instructions specify that the second version of the user interface is to include one or more user interface elements at each location in a second set of one or more locations on the user interface that are different from the first set of one or more locations on the user interface.

6. The computer-implemented method of claim 3, wherein using the first set of content data and the first set of instructions to present content through the first version of the user interface of the application comprises:

presenting, as first output of the client device, (i) the first version of the user interface including the first arrangement of user interface elements, and (ii) the content indicated by the first set of content data through one or more user interface elements in the first arrangement of user interface elements; and wherein using the first set of content data and the second set of instructions to present content through the second version of the user interface of the application comprises:

presenting, as output of the client device, (i) the second version of the user interface including the second arrangement of user interface elements, and (ii) the content indicated by the first set of content data through one or more user interface elements in the second arrangement of user interface elements.

7. The computer-implemented method of claim 3, further comprising:

while using the first set of content data and the first set of instructions to present, as output of the client device, content through the first version of the user interface of the application, receiving, by the client device, input data indicating user input received at a first user interface element in the first arrangement of user interface elements that corresponds to a first function of the application; and in response to receiving input data indicating user input received at the first user interface element in the first arrangement of user interface elements, executing, by the client device, the first function of the application to which the first user interface element corresponds.

8. The computer-implemented method of claim 7, further comprising:

while using the first set of content data and the second set of instructions to present, as output of the client device, content through the second version of the user interface of the application, receiving, by the client device, input data indicating user input received at a second, different user interface element in the second arrangement of user interface elements that corresponds to a second, different function of the application; and in response to receiving input data indicating user input received at a second user interface element in the second arrangement of user interface elements, executing, by the client device, a second function of the application to which the second user interface element corresponds.

9. The computer-implemented method of claim 1, wherein determining that the particular event associated with the application has occurred comprises:

determining, by the client device, that the application has been running on the client device as a background process for a particular amount of time.

10. The computer-implemented method of claim 1, wherein determining that the particular event associated with the application has occurred comprises:

determining, by the client device, that the client device has physically entered or exited a particular geographic location.

11. The computer-implemented method of claim 1, further comprising:

sending, by the client device, a request to the computing device for data indicating instructions for generating the user interface of the application and data indicating content that is to be presented through the user interface of the application; and wherein receiving (i) the first set of content data indicating content that is to be presented through the user interface of the application, and (ii) the second data indicating the second set of instructions for generating the second version of the user interface of the application that is different from the first version of the user interface of the application comprises:

based on sending the request to the computing device, receiving, by the client device, data from the computing device including (i) the first set of content data indicating content that is to be presented through the user interface of the application, and (ii) the second data indicating the second set of instructions for generating the second version of the user interface of the application that is different from the first version of the user interface of the application.

12. The computer-implemented method of claim 11, wherein the application that is running on the client device is that which was downloaded to the client device from a particular digital distribution platform, and wherein the computing device is not part of the particular digital distribution platform.

13. The computer-implemented method of claim 1, further comprising:

receiving, by the client device, data indicating the first set of instructions for generating the first version of the user interface of the application;

in response to receiving the data indicating the first set of instructions for generating the first version of the user interface of the application, storing, by the client device, the first set of instructions for generating the first version of the user interface of the application; and wherein accessing, by the client device, the first set of instructions for generating the first version of the user interface of the application that is running on the client device comprises:

accessing, by the client device, the first set of instructions stored on the client device.

14. The computer-implemented method of claim 13, further comprising:

In response to receiving the first set of content data and the second data indicating the second set of instructions, determining, by the client device, that the second set of instructions is different from the first set of instructions stored on the client device; and after using the first set of content data and the first set of instructions to present, as output of the client device and based on determining that the second set of instructions is different from the first set of instructions stored on the client device, storing, by the client device, the second set of instructions in place of the first set of instructions.

15. The computer-implemented method of claim 13, further comprising:

launching the application on the client device;

wherein accessing, by the client device, the first set of instructions stored on the client device comprises:

in response to launching the application on the client device, accessing, by the client device, the first set of instructions stored on the client device.

16. The computer-implemented method of claim 1, comprising:

displaying, through the second version of the user interface and based on the comparison between the first set of instructions and the second set of instructions, a portion of the first set of content data having the second prioritization score before updating the first set of content data associated with the first prioritization score, wherein the first set of content data includes: textual content, graphical content, or textual and graphical content.

17. A system comprising:

a client device, comprising one or more processors, configured to communicate over a network with a computing device, the one or more processors configure to:

access a first set of instructions for generating a first version of a user interface of an application that is running on the client device;

while or after accessing the first set of instructions, receive (i) a first set of content data including first prioritization score content and second prioritization score content that is to be presented through the user interface of the application, and (ii) second data indicating a second set of instructions for generating a second version of the user interface of the application that is different from the first version of the user interface of the application, wherein the first prioritization score content is generated at the second version of the user interface before second prioritization score content;

after receiving the first set of content data and second data indicating the second set of instructions, using the first set of content data and the first set of instructions to present, as first output of the client device, content through the first version of the user interface of the application;

while or after using the first set of content data and the first set of instructions to present content through the first version of the user interface of the application, determine that a particular event associated with the application has occurred, wherein the content is presented at a first location relative to a location of the first version of the user interface; and in response to determining that the particular event associated with the application has occurred, use the first set of content data and the second set of instructions to present content through the second version of the user interface of the application, wherein the second set of instructions provide instructions to:

display, at a second location, user interface elements through the second version of the user interface based on a comparison between the first set of instructions and the second set of instructions, wherein: i) the user interface elements are displayed at the second location relative to a location of the second version of the user interface, ii) the first set of content data including content that was previously provided for output for a prior session of the application, and iii) wherein the second location relative to the second version of the user interface is different from the first location relative to the first version of the user interface.

18. The system of claim 17, wherein the one or more processors is configured to:

receive (i) the first set of content data indicating content that is to be presented through the user interface of the application, and (ii) the second data indicating the second set of instructions for generating the second version of the user interface of the application that is different from the first version of the user interface of the application comprises:

receive a data structure associated with the application that is running on the client device, the data structure including (i) the first set of content data indicating content that is to be presented through the user interface of the application, and (ii) third data indicating a second set of instructions for generating a second version of the user interface of the application that is different from the first version of the user interface of the application.

19. The system of claim 17, wherein the one or more processors is configured to:

determine that the first set of instructions specify that the first version of the user interface is to include a first arrangement of user interface elements;

based on determining that the first set of instructions specify that the first arrangement of user interface elements are to be included in the first version of the user interface, generate, the first version of the user interface including the first arrangement of user interface elements;

determine that the second set of instructions specify that the second version of the user interface is to include a second arrangement of user interface elements that is different from the first arrangement of user interface elements; and based on determining that the second set of instructions specify that the second arrangement of user interface elements are to be included in the second version of the user interface, generate the second version of the user interface including the second arrangement of user interface elements.

20. The system of claim 19, wherein the one or more processors is configured to:

determine that the first set of instructions specify that the first version of the user interface is to include a first set of one or more user interface elements; and determine that the second set of instructions specify that the second version of the user interface is to include a second set of one or more user interface elements that are different from the first set of one or more user interface elements.

* * * * *